United States Patent
Vasseur et al.

(10) Patent No.: US 9,967,170 B2
(45) Date of Patent: May 8, 2018

(54) DYNAMIC CAPACITY-BASED ROUTING DOMAIN LOAD BALANCING

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 14/565,693

(22) Filed: Dec. 10, 2014

(65) Prior Publication Data

US 2016/0021010 A1    Jan. 21, 2016

Related U.S. Application Data

(60) Provisional application No. 62/027,041, filed on Jul. 21, 2014.

(51) Int. Cl.
*H04L 12/715* (2013.01)
*H04L 12/721* (2013.01)

(52) U.S. Cl.
CPC .............. *H04L 45/04* (2013.01); *H04L 45/38* (2013.01); *H04L 45/44* (2013.01)

(58) Field of Classification Search
CPC ...... H04L 41/5003; H04L 45/04; H04L 45/38
See application file for complete search history.

(56) References Cited

U.S. PATENT DOCUMENTS

| | | | |
|---|---|---|---|
| 9,020,008 B2 | 4/2015 | Hui et al. | |
| 2008/0219272 A1* | 9/2008 | Novello | H04L 45/04 370/401 |
| 2012/0278477 A1* | 11/2012 | Terrell | H04L 41/5009 709/224 |
| 2012/0307825 A1* | 12/2012 | Hui | H04W 28/14 370/390 |
| 2013/0016612 A1* | 1/2013 | Vasseur | H04L 45/48 370/235 |

OTHER PUBLICATIONS

Papanikos et al. "A Study on Dynamic Load Balance for IEEE 802.11b Wireless LAN" pp. 1-7.
Winter et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Sulaiman Nooristany
(74) *Attorney, Agent, or Firm* — Parker Ibrahim & Berg LLP; James M. Behmke; Stephen D. LeBarron

(57) ABSTRACT

In one embodiment, a device in a network identifies a routing domain migration candidate node in a first routing domain that is in range of a second routing domain. The device determines that the second routing domain is able to accommodate the candidate node sending traffic via the second routing domain. The device determines that the candidate node should send traffic via the second routing domain, based in part on a determination that the second routing domain is able to accommodate the candidate node sending traffic via the second routing domain. The device causes the candidate node to send traffic via the second routing domain.

24 Claims, 13 Drawing Sheets

DYNAMIC CAPACITY-BASED ROUTING DOMAIN LOAD BALANCING

RELATED APPLICATIONS

This application claims priority to U.S. Provisional Application No. 62/027,041, filed Jul. 21, 2014, entitled: "DYNAMIC CAPACITY-BASED ROUTING DOMAIN LOAD BALANCING," by Vasseur et al., the contents of which are herein incorporated by reference.

TECHNICAL FIELD

The present disclosure relates generally to computer networks, and, more particularly, to dynamic capacity-based routing domain load balancing.

BACKGROUND

Low power and Lossy Networks (LLNs), e.g., sensor networks, have a myriad of applications, such as Smart Grid Advanced Metering Infrastructure (AMI) and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Some LLN deployments, such as Smart Grid AMI deployments, may include upwards of millions of LLN nodes/devices. To account for the typically constrained nature of the various devices, mesh technologies (e.g., CG-Mesh, RFLAN, etc.) often divide the deployed devices into smaller sets, with each being serviced by a border router. Thus, the mesh network may be divided into any number of routing domains, sometimes referred to as personal area networks (PANs) in the context of LLNs, each routing domain having a border router providing inter-domain connectivity to the nodes in its local domain.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
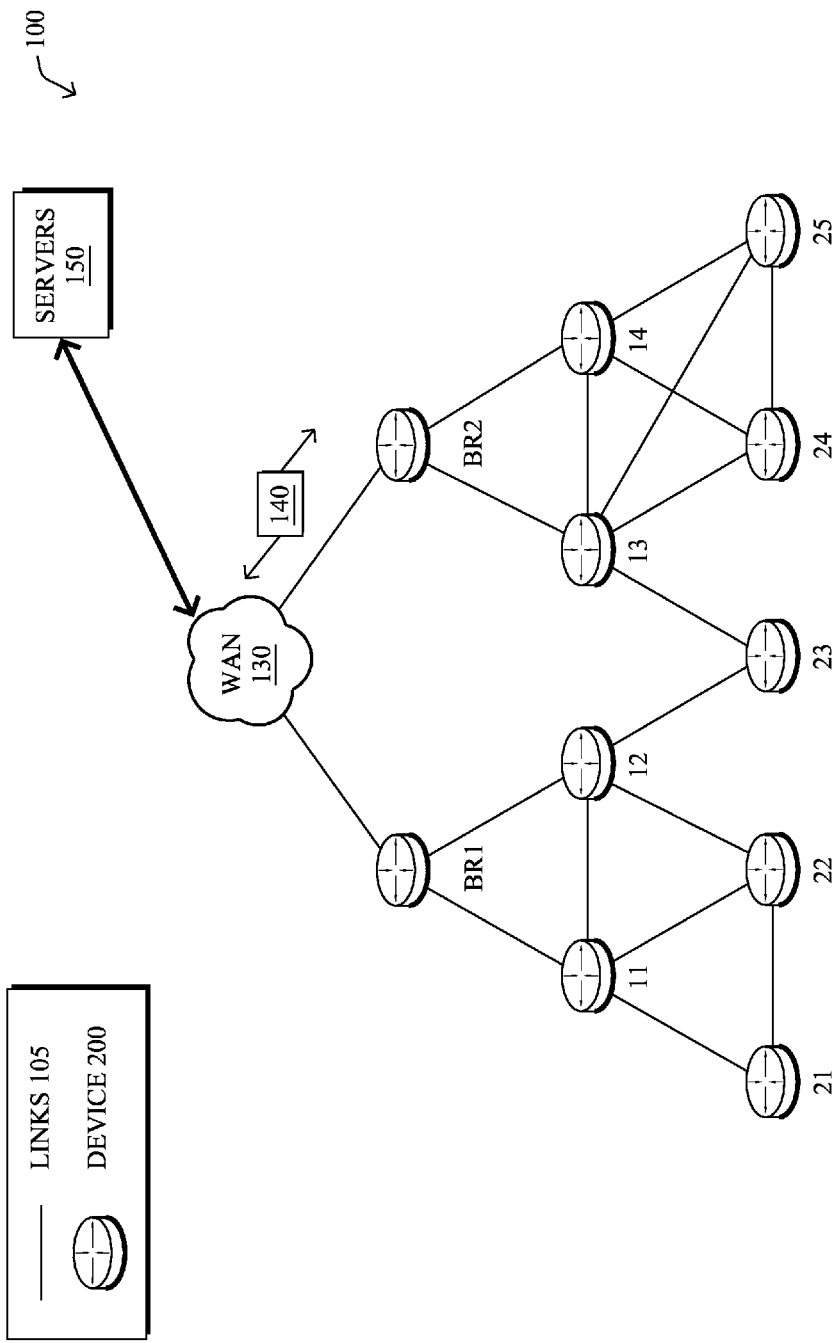
FIG. 1 illustrates an example communication network.

According to one or more embodiments of the disclosure, a device in a network identifies a routing domain migration candidate node in a first routing domain that is in range of a second routing domain. The device determines that the second routing domain is able to accommodate the candidate node sending traffic via the second routing domain. The device determines that the candidate node should send traffic via the second routing domain, based in part on a determination that the second routing domain is able to accommodate the candidate node sending traffic via the second routing domain. The device causes the candidate node to send traffic via the second routing domain.

In further embodiments, a device in a network receives information regarding a routing domain migration candidate node that is in a first routing domain of the network and is in range of a second routing domain. The device determines a capacity of the second routing domain to accommodate traffic from the candidate node. The device provides an indication of the capacity of the second routing domain to accommodate traffic from the candidate node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, border routers "BR1" and "BR2," nodes "11," "12,"... "45," etc. and described in FIG. 2 below) interconnected by various methods of communication. For instance, the links 105 may be dedicated links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative border routers BR1 and BR2, such as field area routers (FARs), may interconnect the local networks with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with certain "root" nodes, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
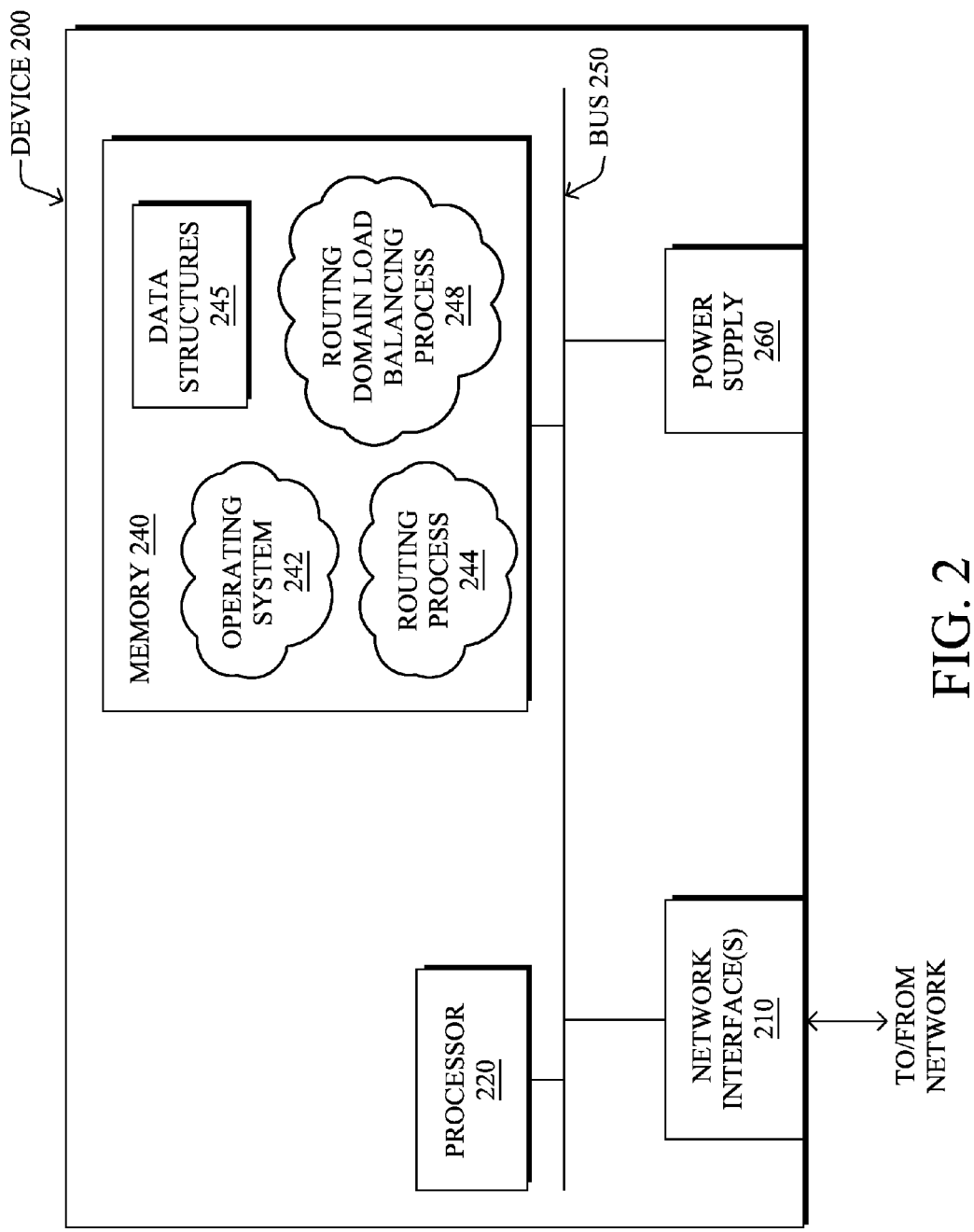
FIG. 2 illustrates an example network device/node.

FIG. 2 is a schematic block diagram of an example node/device 200 that may be used with one or more embodiments described herein, e.g., as any of the nodes shown in FIG. 1 above. The device may include one or more network interfaces 210 (e.g., wired, wireless, PLC, etc.), at least one processor 220, and a memory 240 interconnected by a system bus 250, as well as a power supply 260 (e.g., a battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations, the PLC signal may be coupled to the power line feeding into power supply 260.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic adapted to execute the software programs and manipulate the data structures 245. An operating system 242, portions of which are typically resident in memory 240 and executed by processor 220, functionally organizes the device by, inter alia, invoking operations in support of software processes and/or services executing on the device. These software processes and/or services may include routing process/services 244 and a routing domain load balancing process 248, as described herein. Note that while processes 244 and 248 are shown in centralized memory 240, alternative embodiments provide for the processes to be specifically operated within the network interfaces 210 (e.g., as part of the MAC layer).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from LLN devices towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by process 244) based on an objective function (OF). The role of the OF is generally to specify rules on how to build the DAG (e.g. number of parents, backup parents, etc.).

Figure 3:
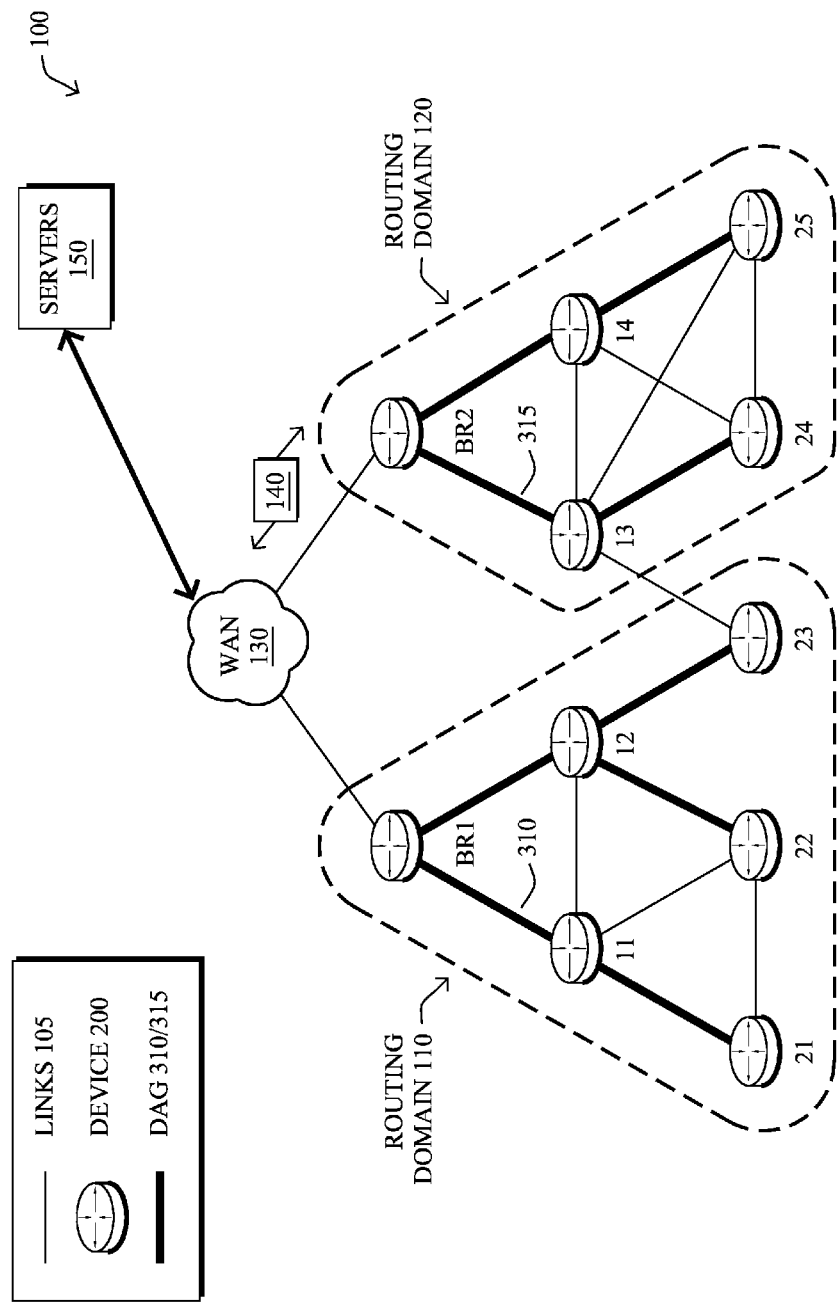
FIG. 3 illustrates an example of network nodes forming routing domains.

FIG. 3 illustrates example simplified DAGs that may be created, e.g., through the techniques described above, within network 100 of FIG. 1. For instance, certain links 105 may be selected for each node to communicate with a particular parent (and thus, in the reverse, to communicate with a child, if one exists). These selected links form the DAGs 310, 315 (shown as bolded lines), which extends from the root nodes (e.g., border routers BR1 and BR2) toward one or more leaf nodes (nodes without children). Traffic/packets 140 (shown in FIG. 1) may then traverse DAG 310 or DAG 315 in either the upward direction toward the root or downward toward the leaf nodes, particularly as described herein.

Related to the formation of DAGs 310, 315 is the concept of a routing area. First, a routing area defines the scope of the link-layer group keys used by devices to secure their link frames. The group keys are shared to enable true broadcast communication. Second, a routing area defines the scope of the broadcast schedule. In some implementations, the individual nodes may each define its own channel-hopping schedule used for unicast communications. Thus, neighboring devices of a given node must synchronize with the node's unicast schedule, to properly communicate a unicast frame. By having each device determine their own schedule independently, neighboring transmitter-receiver pairs can communicate simultaneously on different channels. In some cases, each routing area may overlay a broadcast schedule across the routing area, whereby each node in the routing area is synchronized to the same channel-hopping schedule. The broadcast schedule is typically only active for a fraction of the time (e.g., 25%), but allows for efficient broadcasts within the routing area since only a single transmission can reach an arbitrary number of neighbors. This hybrid approach allows the networks to maximize spectral efficiency for unicast communications, while also allowing for efficient broadcast communications.

Dividing LLNs into multiple routing domains presents far greater challenges than in classic networks, since resources in an LLN are very constrained in contrast with most IP/MPLS networks. Furthermore, while an IP/MPLS node may typically be assigned to a routing domain by a user, nodes in IoT networks may self-join routing domains. For example, as shown in FIG. 3, each of nodes 11-25 may join a routing domain headed by one of border routers BR1 or BR2, based on the reachability and/or path costs between a given node and a border router. For example, in certain deployments, devices may join routing domains based on metrics included in IEEE 802.15.4 Enhanced Beacons. In general, LLN devices favor routing domains that have fewer devices attached and reduce their path cost to a border router, which allows for a naïve form of load balancing across routing domains. Generally speaking, the primary goal of a node when joining a routing domain is to find good connectivity to the WAN (e.g., WAN 130). For example, node 23 may be able to reach both BR1 and BR2, but elect to join routing domain 110 over routing domain 120, if the path cost to BR2 is higher than the path cost to BR1.

While LLN nodes may join routing domains in a way that provides naïve load balancing (e.g., nodes may prefer routing domains with fewer nodes), a number of observations may be made that show the limits of this approach. First, the number of nodes at the border between two routing domains may be much higher than expected. Second, the advertisement of routing domain-specific metrics may be too basic to allow for true load balancing.

Dynamic Capacity-Based Routing Domain Load Balancing

The techniques herein provide mechanisms that enhance load balancing across overlapping routing domains (e.g., domains that include one or more nodes that could join either routing domain). In one aspect, nodes at the boundary of multiple routing domains may be detected and information about the nodes may be advertised across the different routing domains (e.g., their expected traffic profiles, their node types, etc.). In another aspect, the amount of extra capacity may be computed for each node at the boundary between routing domains. In a further aspect, mechanisms are disclosed that allow traffic to be shed between routing domains (e.g., all traffic, traffic of a specific class, etc.), either permanently or temporarily. In yet another aspect, node types may be considered, in addition to the nodes' traffic profiles, when determining whether to migrate a node between routing domains, thereby increasing the resiliency of a mesh that makes use of pre-computed backup topologies.

Illustratively, the techniques described herein may be performed by hardware, software, and/or firmware, such as in accordance with the "routing domain load balancing" process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, according to various embodiments herein, a device in a network identifies a routing domain migration candidate node in a first routing domain that is in range of a second routing domain. The device determines that the second routing domain is able to accommodate the candidate node sending traffic via the second routing domain. The device determines that the candidate node should send traffic via the second routing domain, based in part on a determination that the second routing domain is able to accommodate the candidate node sending traffic via the second routing domain. The device causes the candidate node to send traffic via the second routing domain.

Figure 4A:
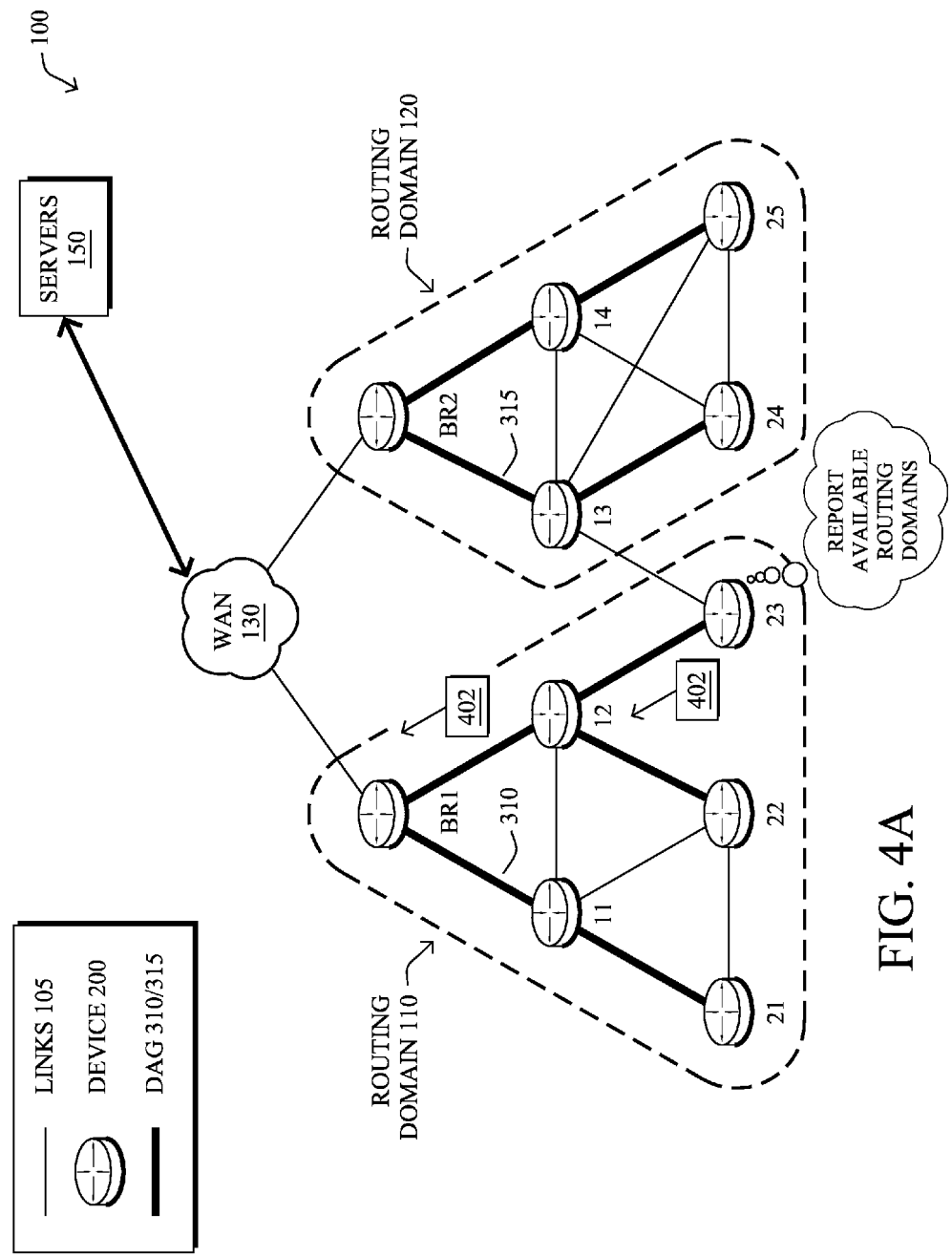
FIGS. 4A-4C illustrate examples of devices exchanging information regarding a routing domain migration candidate.

Operationally, network nodes may be configured to detect and report their available routing domains to their DAG roots or to another supervisory device. For example, as shown in FIG. 4A, assume that node 23 belongs to routing domain 110 and borders both routing domains 110 and 120. In various embodiments, node 23 may send domain information 402 to its DAG root BR1 that indicates that both routing domains 110 and 120 are visible to node 23. As noted previously, node 23 may identify its reachable routing domains (e.g., domains 110 and 120) based on beacons or other data received from its neighbors (e.g., nodes 12 and 13), as part of a network join process.

In one embodiment, node 23 may include domain information 402 within a routing protocol message. For example, if RPL is used for routing in network 100, node 23 may provide a Destination Advertisement Object (DAO) message to BR1 as part of the formation of DAG 310. In general, a DAO is a type of DAG discovery reply message that conveys destination information upwards along the DAG so that a DAG Root/Border Router, and any other intermediate nodes, can provision downward routes. Such a message may be extended to include a new type-length-value (TLV) that carries domain information 402. In another embodiment, domain information 402 may be included in a custom CoAP message sent to the NMS (e.g., one of servers 150). In such a case, the NMS may relay domain information 402 back to the DAG Root/BR, if the DAG Root/BR is configured to analyze domain information 402.

In one embodiment, only nodes that observe multiple routing domains may report the set of visible domains via domain information 402. For example, node 23 may report domain information 402 indicating that it borders both routing domains 110, 120, whereas node 11 may not provide any domain information if node 11 only detects routing domain 110. In another embodiment, all nodes in the local routing domain, or a specified subset of the nodes, may be instructed to report domain information 402. In another embodiment, a reporting node may not explicitly indicate its currently-joined routing domain when providing domain information 402. For example, domain information 402 sent by node 23 to BR1 may only include information regarding routing domain 120, if node 23 is currently a member of routing domain 110 rooted at BR1.

Domain information 402 may be reported by a node under various conditions. In some embodiments, a node may be configured to report domain information 402 periodically or in response to a network event (e.g., the node is joining a routing domain, etc.). In other embodiments, a node may provide domain information 402 on a "pull" basis and in response to a request for the information. For example, node 23 may send domain information 402 to BR1 or to the NMS, in response to first receiving a request for this information.

As a result of nodes reporting domain information 402, each FAR/BR (or other supervisory device) in overlapping routing domains have full visibility of the set of nodes that border multiple routing domains. As would be appreciated, the number of nodes in a typical deployment may be fairly large, meaning that a large number of node that fall into this category. Accordingly, these nodes may heavily influence the amount of traffic generated in each PAN/routing domain, when a large number of nodes that fall into this category exist.

Figure 4B:
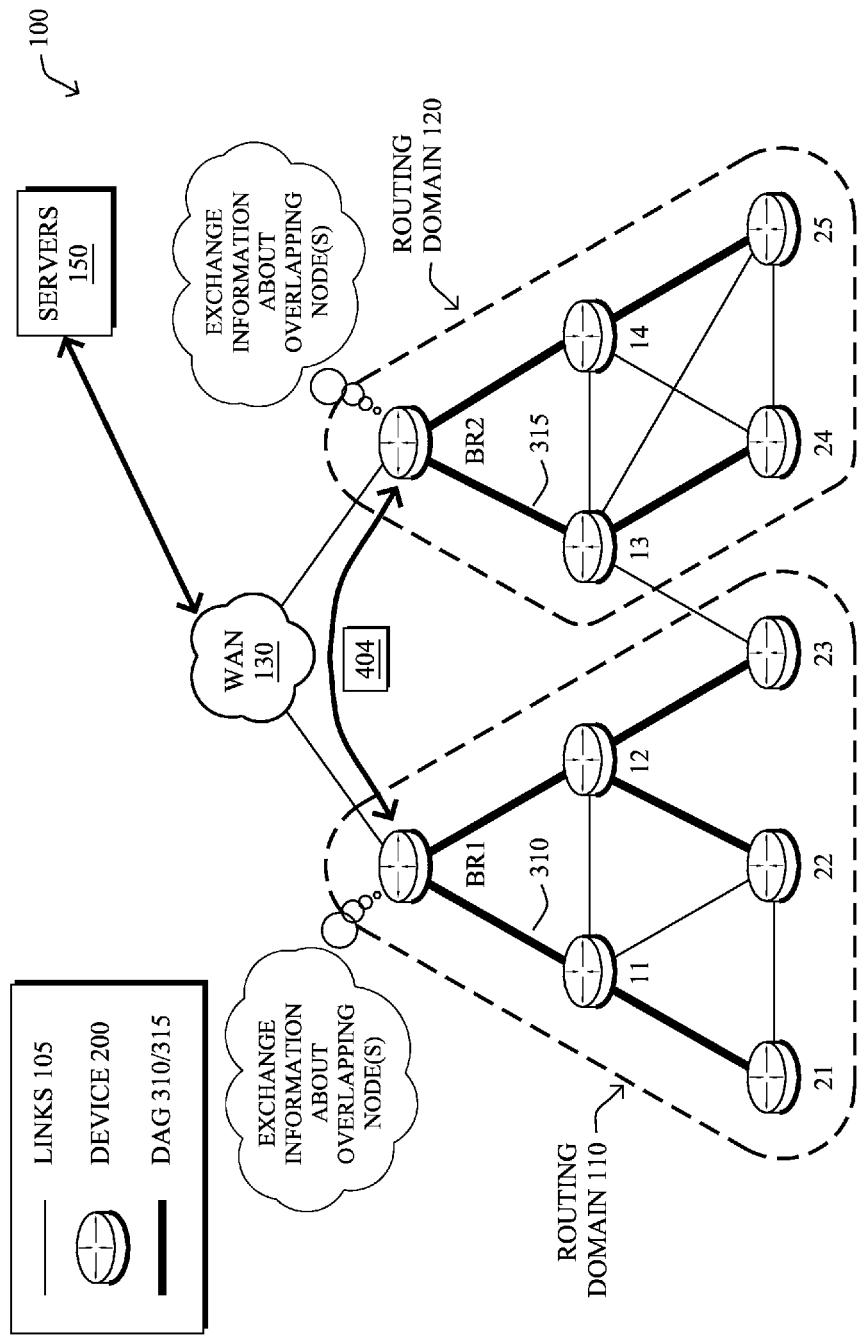

Referring now to FIG. 4B, FARs/BRs may exchange information 404 regarding any nodes that overlap routing domains (e.g., any nodes that have visibility of more than one PAN/routing domain). In various embodiments, information 404 may be a custom IP message (e.g., an IPv6 message) that includes node IDs for the nodes that overlap routing domains. For example, BR1 may send information 404 to BR2 that indicates that node 23 overlaps both routing domains 110 and 120.

Information 404 may generally include any information that may be used to determine whether to migrate a node from one local routing domain to another. In one embodiment, information 404 may include data indicative of the traffic profile of any nodes that overlap routing domains. In various embodiments, the traffic profile may be characterized by the average number of bytes, peak number of bytes, or even a statistical metric or function (e.g., a probability distribution function) of the packet size, traffic spikes, or any other metric that characterizes the traffic profile of a node that overlaps routing domains. In another embodiment the traffic profile of a node may be extended on a per-class-of-service (CoS) basis, if the network makes use of Quality of Service (QoS) functionality. In another embodiment, information 404 may indicate a node type of a node that overlaps routing domains. In some embodiments, the node type may be provided to the FAR/BR when the node registers with the network (e.g., via a customized message sent by the corresponding NMS). The node type may then be a consideration when the supervisory device determines whether to migrate the node across routing domains.

In one example, as depicted in FIG. 4B, BR1 may provide information 404 to BR2 that identifies node 23 as a node that overlaps routing domains 110 and 120, the traffic profile associated with node 23, and/or the node type of node 23. In many deployments, information 404 may include information regarding a plurality of nodes that have visibility of more than one routing domain (e.g., tens, hundreds, etc.).

In general, traffic profile information may include any data that categorizes the traffic associated with a particular node. For example, traffic profile information may indicate the types/classes of the traffic associated with the node, the bandwidth consumed by the traffic, the periodicity of the traffic (e.g., a Smart Meter may provide meter readings periodically, power outage notifications may occur at any time without warning, etc.). Since traffic is typically routed from the node through the FAR/BR, the FAR/BR may monitor this traffic to determine the traffic profile, in some embodiments.

Figure 4C:
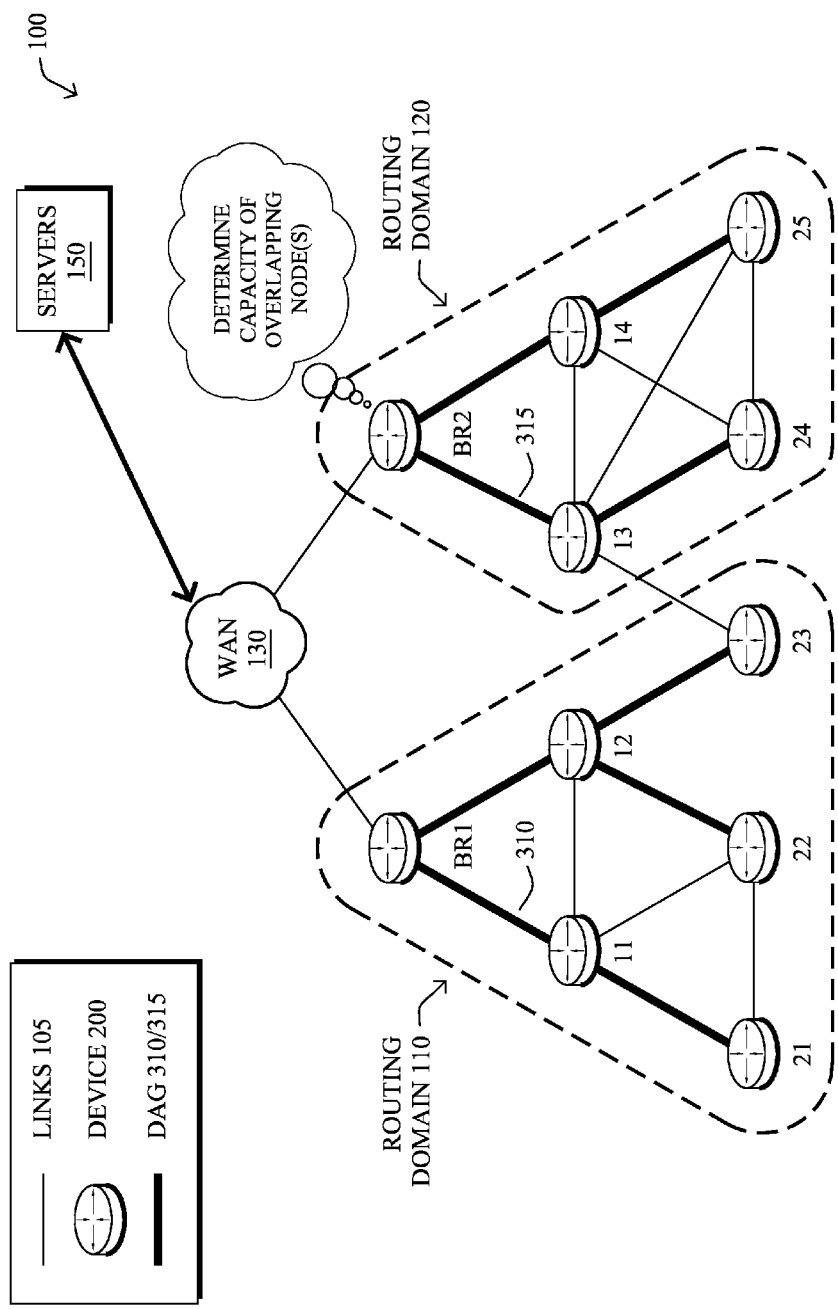

In various embodiments, a BR/Root node or another supervisory device may be configured to compute the spare capacity in a mesh/routing domain and use this information to migrate nodes that have visibility of multiple routing domains. In particular, and in contrast to existing techniques, the device may compute the amount of extra traffic that could be handled for all nodes that can reach two or more routing domains. The device may do so for all nodes that fall into this category and were pre-advertised through the exchange of information 404. For example, as shown in FIG. 4C, BR2 may calculate the amount of extra capacity for node 23, in response to receiving information 404 from BR1 regarding node 23.

Figure 5A:
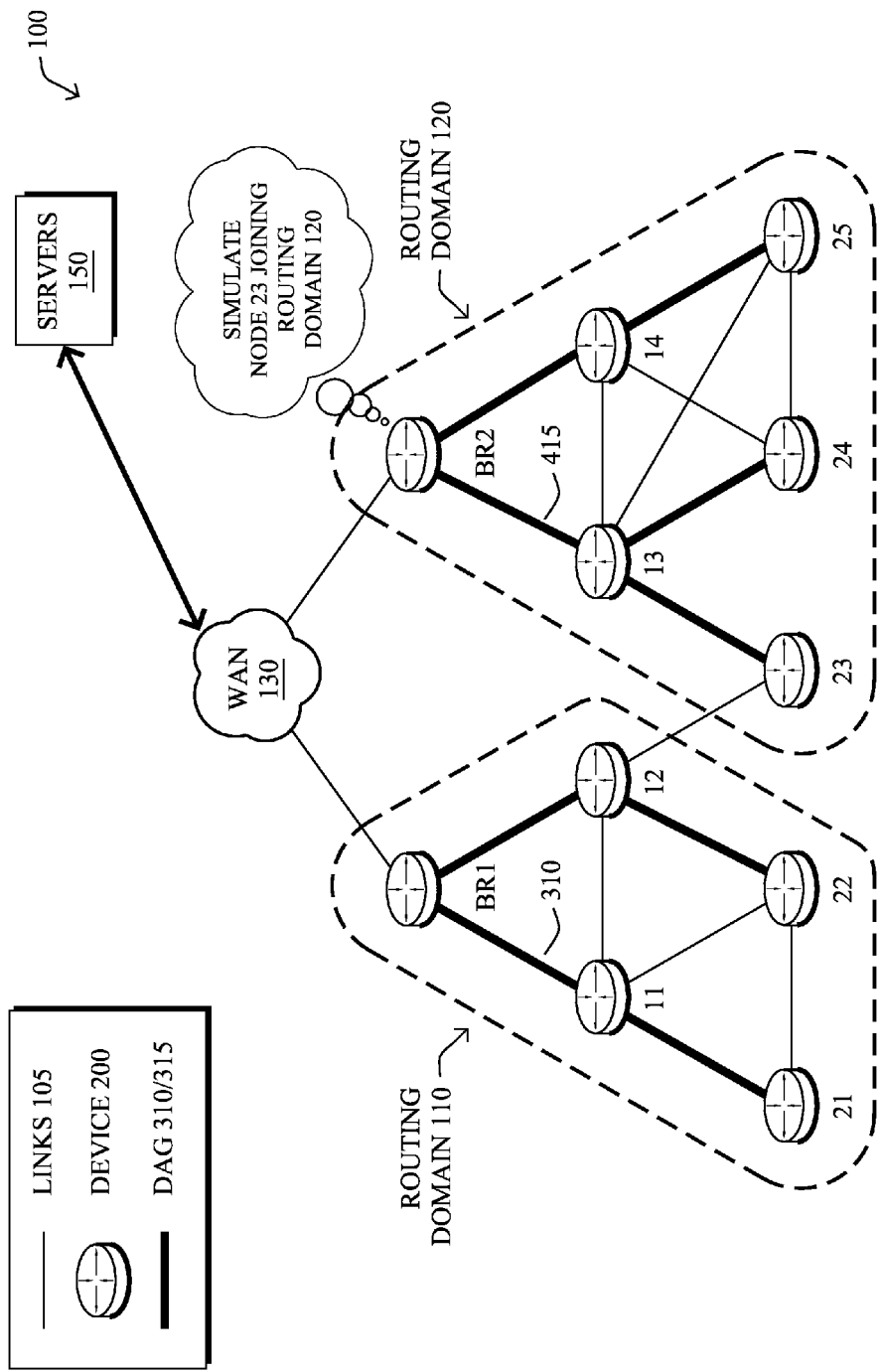
FIGS. 5A-5C illustrate examples of a device determining the ability of a routing domain to accommodate a migration candidate.

A supervisory device may determine the amount of extra capacity of an overlapping node in various ways. In one embodiment, a FAR/BR may determine the set of paths an overlapping node would follow in the new routing domain by simulating/emulating the parent selection performed by such a node (e.g., based on the received traffic profile of the node), were the node to join the local routing domain. For example, as shown in FIG. 5A, BR2 may simulate the construction of DAG 415 in which node 23 uses node 13 in routing domain 120 as its parent instead of using node 12 in routing domain 110 (e.g., according to the objective function). The supervisory device may then compute the amount of capacity change that would result in the corresponding paths. For example, BR2 may evaluate the amount of congestion along its existing routing paths (e.g., from node 24 to node 13, from node 13 to BR2, etc.), to determine the amount of extra capacity associated with node 23. In one embodiment, this determination may be made even more granular, by computing the amount of extra capacity on a per-CoS basis.

Figure 5B:
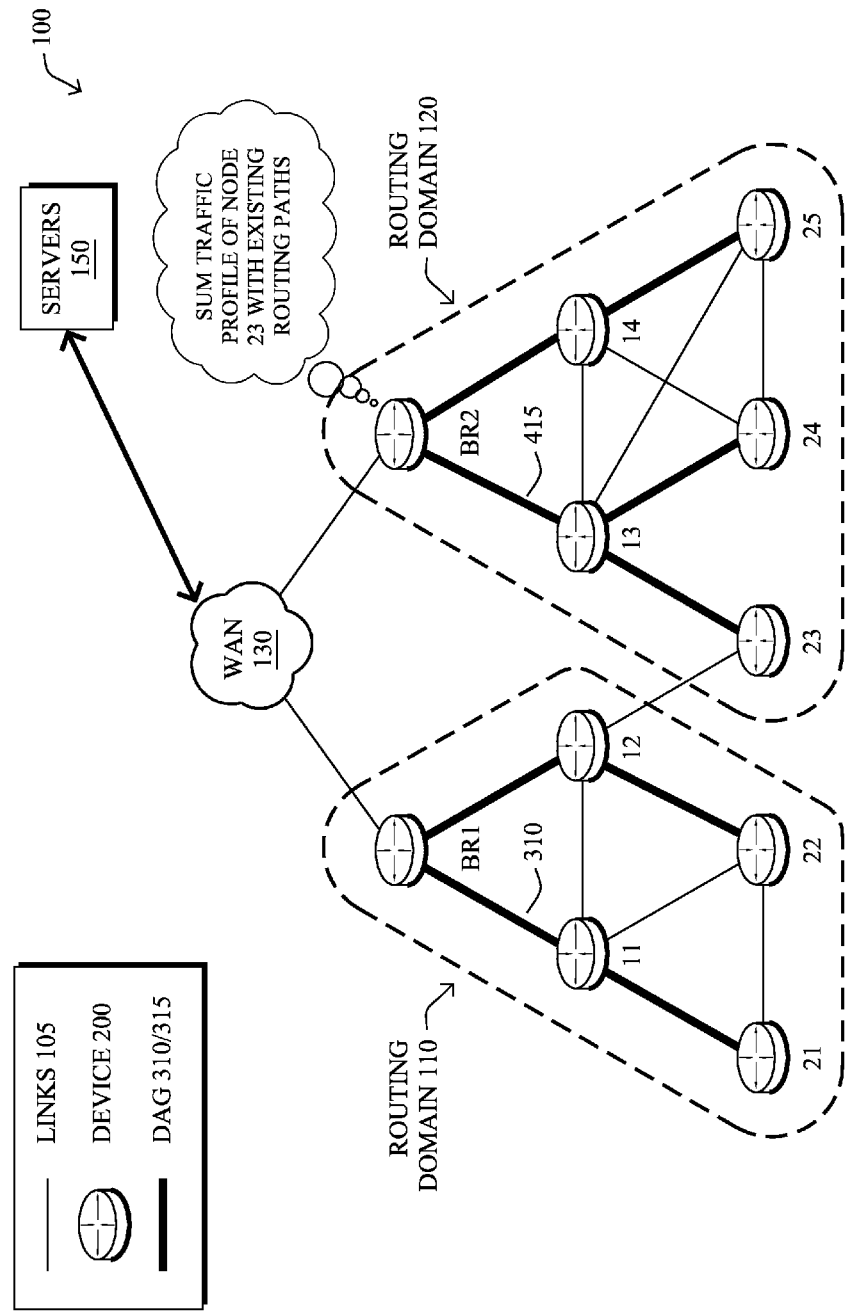

In another embodiment, the supervisory device may take into account the traffic profile of the potential candidate, to determine the amount of extra capacity associated with the node. For example, as shown in FIG. 5B, BR2 may sum the traffic profile of node 23 with the existing traffic profiles that it observes along the candidate path (e.g., the path or paths extending through node 13), to determine the amount of extra capacity. In various embodiments, BR2 may do so by summing the peak amounts of traffic sent by nodes along a given path, by summing Gaussian distributions of the traffic using statistical techniques, or by using any other technique to combine the traffic profile of the candidate node with the existing traffic profiles associated with the candidate path. In some embodiments, the traffic profiles may be combined on a per CoS basis.

Figure 5C:
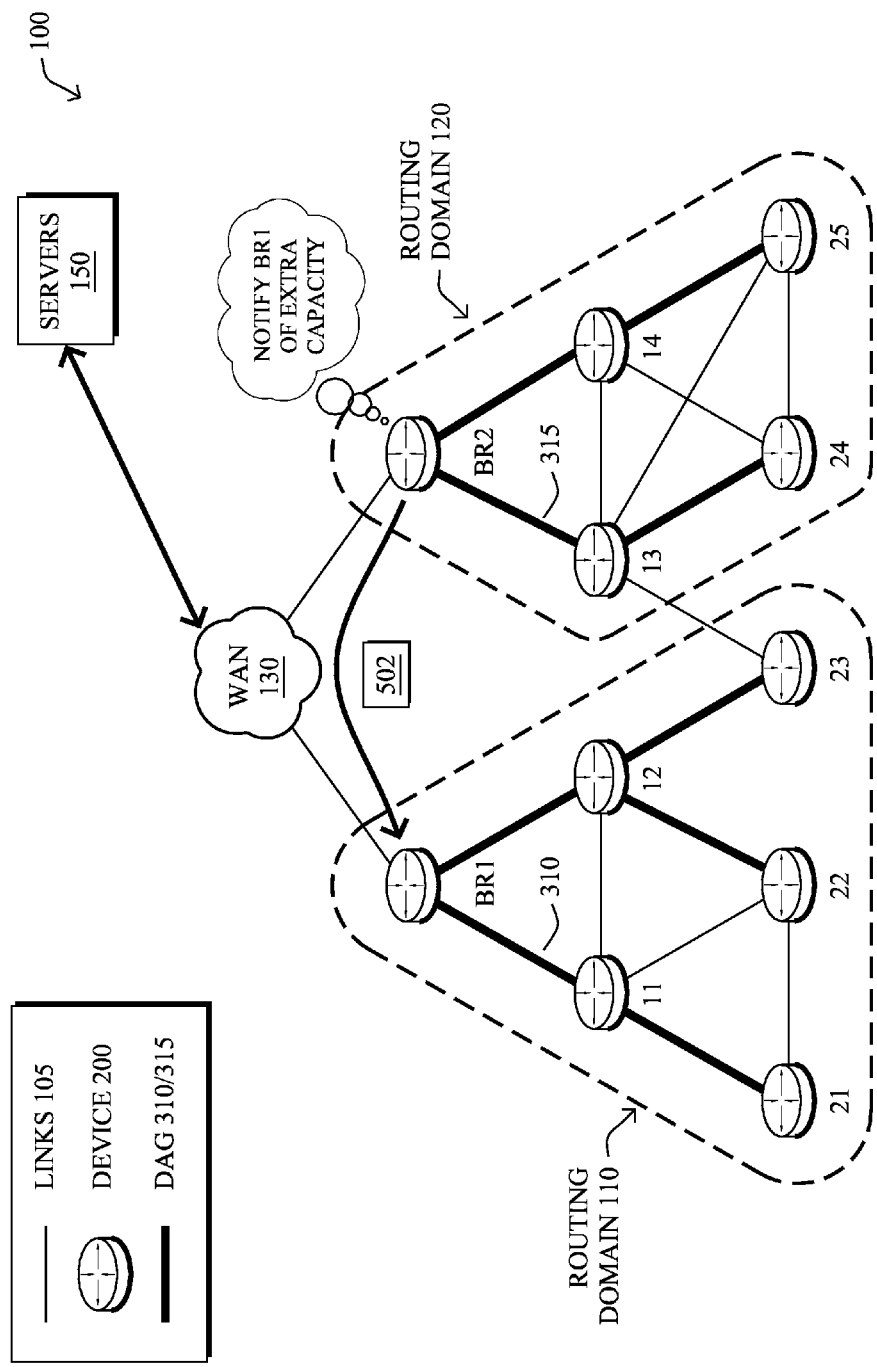

Once the supervisory device has determined the amount of extra capacity associated with the one or more nodes that overlap routing domains, it may notify the corresponding FAR/BR of the neighboring routing domain. For example, as shown in FIG. 5C, BR2 may provide extra capacity information 502 to BR1 regarding the extra capacity calculated for node 23. In other words, BR2 may indicate to BR1 as to whether or not it has extra capacity to accommodate node 23, thereby reducing the load in routing domain 110. In some embodiments, extra capacity information 502 may also be broken down on a per CoS basis, to indicate the ability of routing domain 120 to accommodate the different types of traffic that node 23 may send.

Figure 6A:
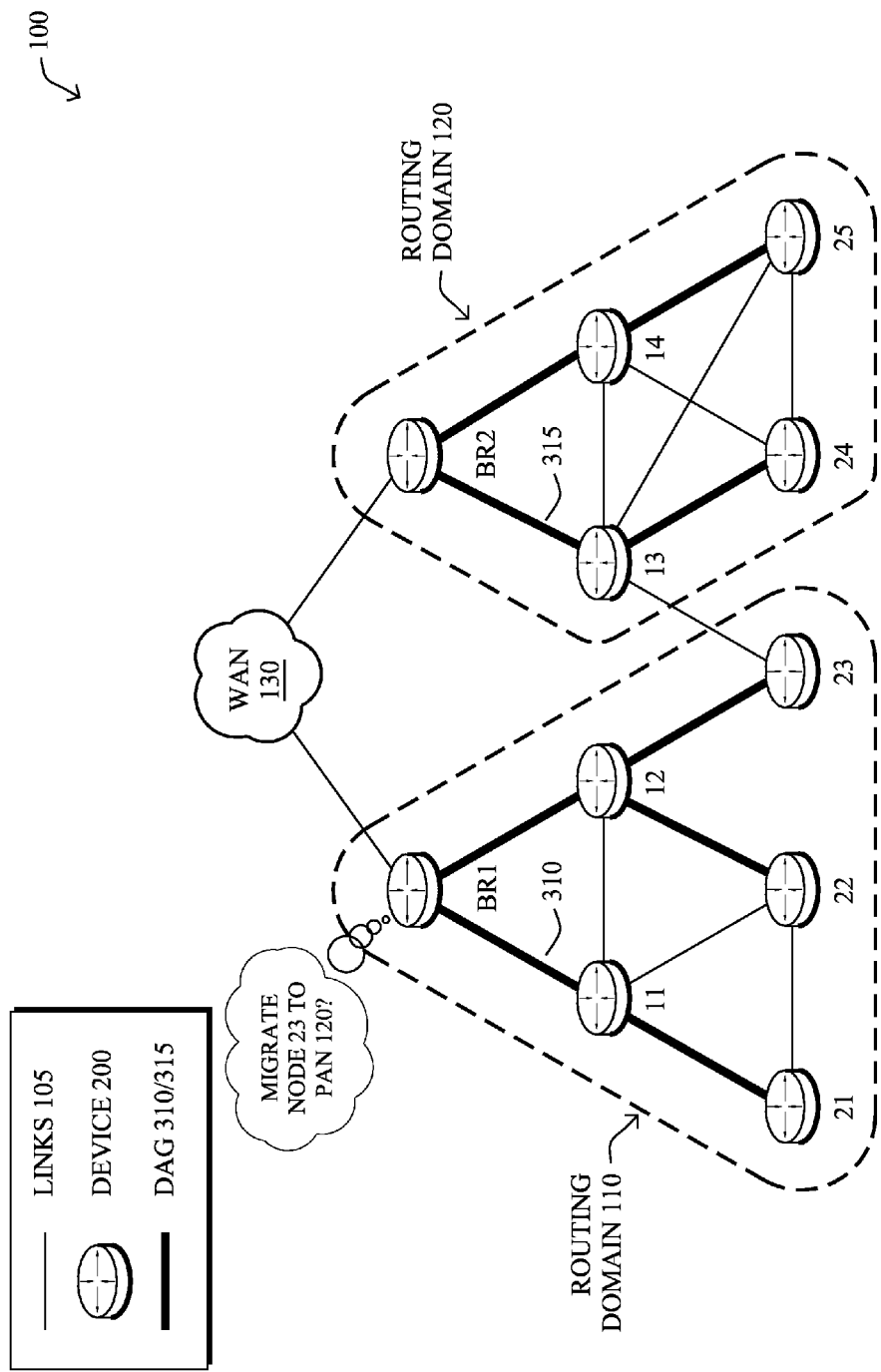
FIGS. 6A-6C illustrate an example of a node migrating to another routing domain.

A FAR/BR or other supervisory device may use extra capacity information received from a neighboring routing domain, to determine whether load balancing should be performed. For example, as shown in FIG. 6A, BR1 may determine whether node 23 should be migrated to routing domain 120. Such a determination may be based on either an observed or a predicted inability of the local routing domain to satisfy any service level agreements (SLAs) associated with traffic sent within routing domain 110. In general, SLAs operate to guarantee a certain level of performance for a particular device or class of traffic (e.g., a bounded amount of delay, jitter, etc.).

Another factor that a supervisory device may consider when determining whether to cause a node to route traffic through a neighboring routing domain is the node type associated with the candidate node. In some cases, certain node types may increase the reliability of the routing area that it joins. For example, nodes that are equipped with battery backup systems or are otherwise protected against power failure (e.g., are equipped with excess persistent memory, etc.), may help to increase the reliability of its routing domain. Notably, some routing techniques may provide for the ability to pre-compute a backup routing topology in the network that makes use of any protected devices in the network. For example, as shown in FIG. 6A, BR1 may base the decision as to whether or not node 23 should join routing domain 120 in part on the node type of node 23 (e.g., whether node 23 is a member of a battery backed routing topology, etc.).

In some embodiments, a FAR/BR of a neighboring routing domain may determine that a node would increase its overall resiliency and build a less sparse backup topology DAG. For example, BR2 may specifically request that node 23 join routing domain 120 (e.g., by including the request in information 502, via a separate request message sent to BR1, etc.) based on node 23 having a battery backup system or having any other node type. In such a case, if routing domain 120 has the extra capacity to accommodate node 23 and BR1 determines that the loss of node 23 will not impinge the resiliency of routing domain 110 in the event of a power outage, BR1 may determine that node 23 should join routing domain 120.

In yet another embodiment, the supervisory device may also take into account the routing topology, when determining whether a node should switch to a different routing domain. For example, the FAR/BR may only instruct leaf nodes of the DAG to migrate first, to avoid disrupting the mesh too much. The FAR/BR may, for example, determine the amount of disruption by simulating the DAG that would result were a specific node or set of nodes instructed to migrate to a different routing domain. The amount of disruption to the routing topology may be quantified by the number of nodes that would need to change parents, the impact on any critical and/or non-critical traffic to be routed, or any other estimated impact on the routing topology.

Figure 6B:
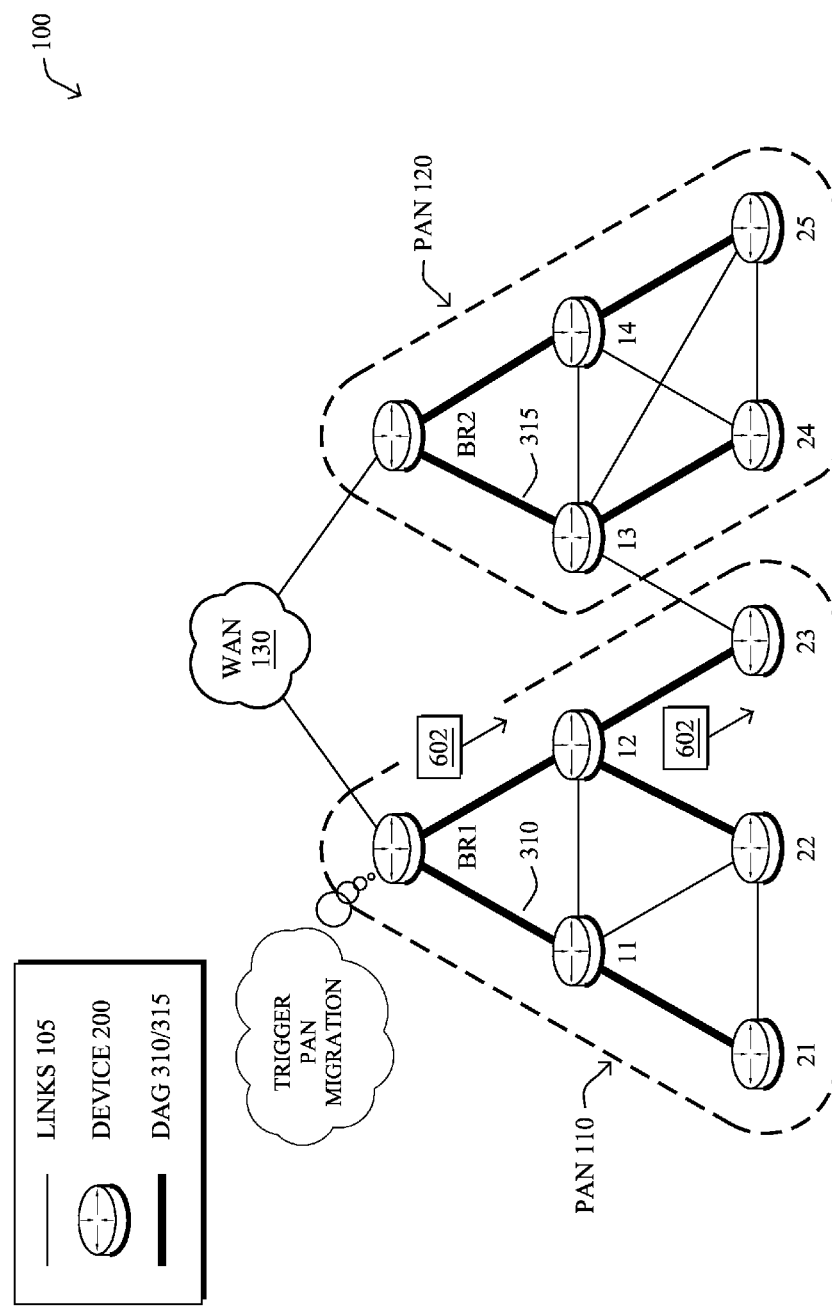

If the supervisory device determines that a node should route its traffic through a neighboring routing domain, the supervisory device may cause the node to begin sending traffic through the other routing domain, provided the other routing domain has extra capacity to accommodate the node. For example, as shown in FIG. 6B, BR1 may send an instruction 602 to node 23 that causes node 23 to send traffic through routing domain 120 instead of routing domain 110. As noted previously, BR1 may send instruction 602 to node 23 if routing domain 120 has extra capacity to accommodate node 23 and any of the following conditions exist: 1.) BR1 determines that traffic in routing domain 110 is not satisfying its associated SLA and moving node 23 to routing domain 120 would alleviate this condition, 2.) BR1 determines that the traffic in routing domain 110 is predicted not to satisfy its associated SLA and moving node 23 to routing domain 120 is predicted to alleviate this condition, 3.) moving node 23 to routing domain 120 would enhance the resiliency of routing domain 120, combinations thereof, or any other case in which moving node 23 to routing domain 120 may be desirable based on the capacities of the two routing domains.

Figure 6C:
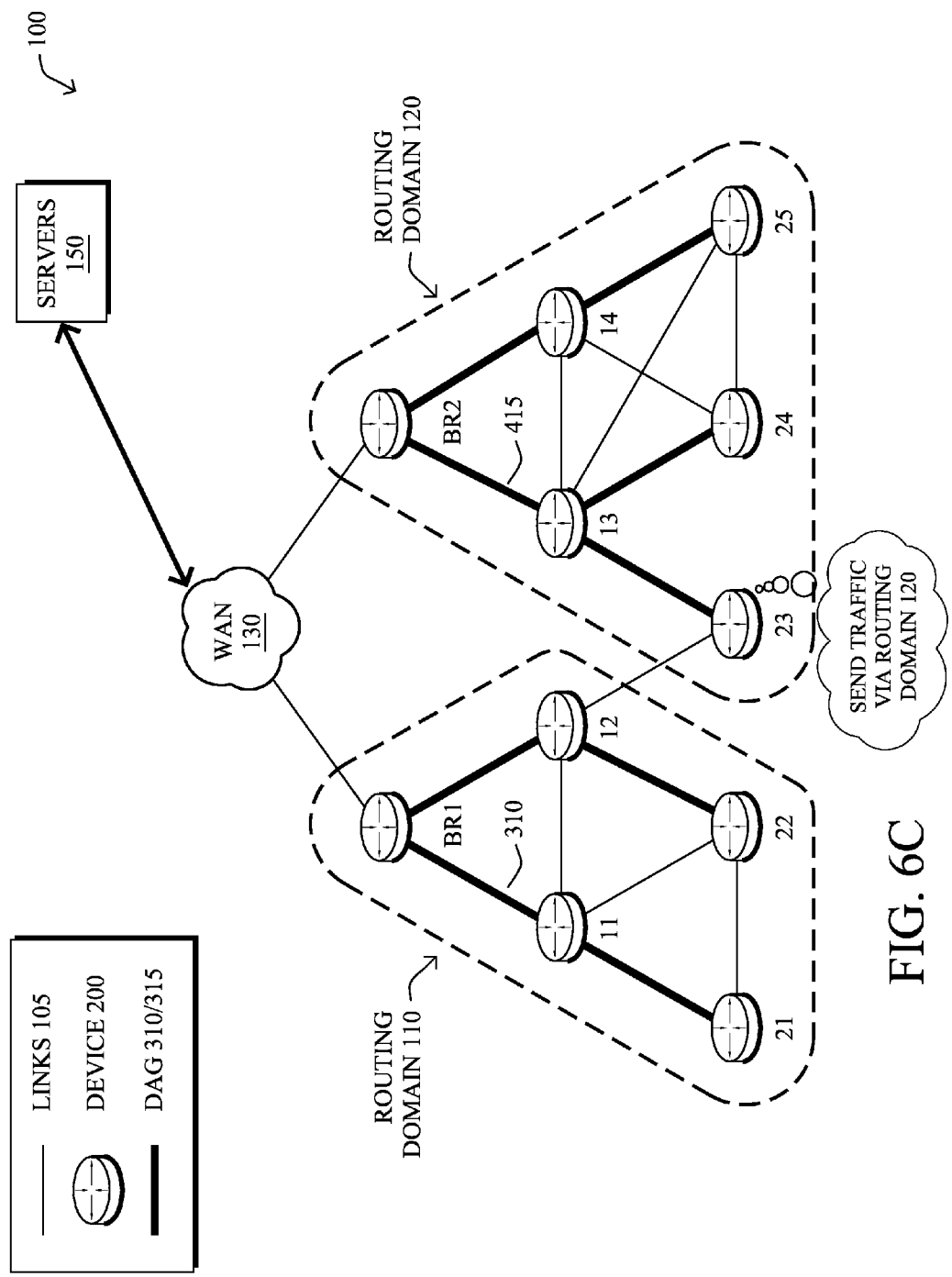

In one embodiment, instruction 602 may be a custom IPv6 CoAP message that explicitly instructions node 23 to send traffic through routing domain 120. According to various embodiments, node 23 may be instructed to route all of its traffic or its traffic belonging to a specific traffic class through routing domain 120. For example, instruction 602 may cause node 23 to send all traffic of a specific class to node 13 instead of node 12. In another embodiment, instruction 602 may cause node 23 to join routing domain 120 permanently, if traffic load sharing is not possible and the problem persists. In another embodiment, instruction 602 may indicate a period of time during which node 23 should route traffic through routing domain 120 (e.g., during periods of historically high traffic in routing domain 110, etc.). In response to receiving instruction 602, as shown in FIG. 6C, node 23 may begin sending some or all of its traffic via routing domain 120 instead of routing domain 110, according to instruction 602.

Figure 7:
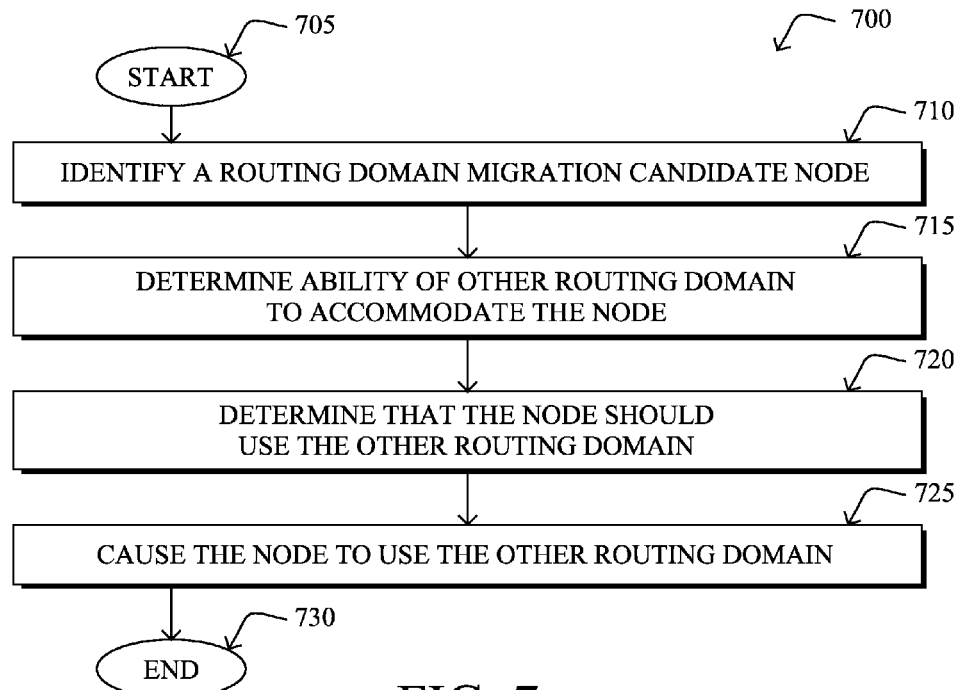
FIG. 7 illustrates an example simplified procedure for causing a node to use another routing domain.

Referring now to FIG. 7, an example simplified procedure for causing a node to use another routing domain is shown, in accordance with various embodiments herein. Procedure 700 may be performed by any network device (e.g., device 200) configured to load balance overlapping routing domains (e.g., a FAR/BR/Root node of a routing domain, an NMS, etc.). Procedure 700 may begin at a step 705 and continue on to step 710 where, as described in greater detail above, the network device identifies a routing domain migration candidate node. The candidate node may be joined to a first routing domain and be within range of one or more other routing domains. As noted above, the node may opt to join the first routing domain according to the routing protocol. For example, if RPL is used, the node may opt to select a parent node in the first routing domain over another node in another routing domain, according to the objective function used.

In various embodiments, the device may identify the routing domain migration candidate node based on an indication from the candidate node that the node is within range of another routing domain. In one embodiment, the indication may be provided to the device via a routing protocol message (e.g., a DAO message in RPL, etc.). In another embodiment, the indication may be provided to the device via an NMS. For example, the node may provide the indication to the NMS via a custom CoAP message and, in turn, the NMS may forward the indication to the device. In various cases, the indication may be provided on a pull basis (e.g., in response to the node receiving a request) or on a push basis (e.g., the node sends the indication unprompted).

At step 715, the device determines that that the second routing domain is able to accommodate the candidate node sending traffic via the second routing domain, as detailed above. Said differently, the device may determine whether or not the second routing domain has sufficient capacity to accommodate traffic from the candidate node. According to various embodiments, the device may send information regarding the candidate node to another network device (e.g., a FAR of the second routing domain), to determine whether the second routing domain has sufficient capacity. This information may include, for example, an identifier for the candidate node, a traffic profile of the candidate node, a node type of the candidate node, combinations thereof, or any other information that may be used by the other device to determine the extra capacity of the second routing domain. In response to sending the information regarding the candidate node, the device may receive capacity information regarding the second routing domain and determine whether the capacity is sufficient.

At step 720, the device determines that the candidate node should send traffic via the second routing domain, as described in greater detail above. In various embodiments, this determination may be based in part on the determination made in step 715 that the second routing domain has capacity to accommodate the candidate node. Notably, the device may not migrate the candidate node to the second routing domain if doing so will impinge on the operation of the second routing network.

Assuming that the second routing network has capacity to accommodate the candidate node, the device may determine that the node should route traffic via the second routing domain in a number of different situations. For example, the device may determine that the node should use the second routing domain based on a determination that traffic in the first routing domain does not satisfy its SLA (e.g., traffic from the node itself, traffic that is impacted by the traffic from the node, etc.). In another embodiment, the device may predict that the traffic in the first routing domain will not satisfy its SLA. In a further embodiment, the device may determine that the node should use the second routing domain based on a determination that doing so will increase the reliability of the second routing domain. For example, the node may be of a certain type (e.g., protected against power failure, etc.) that, when added to the second routing domain, helps to improve its reliability. In yet another embodiment, the determination may be based in part on the routing topology of the first routing domain. For example, the device may only migrate a node when doing so will not significantly impact the remaining nodes (e.g., by migrating only leaf nodes first, etc.).

At step 725, as detailed above, the device causes the candidate node to send traffic via the second routing domain. For example, the device may send an instruction to the node that causes the node to begin using the second routing domain. In one embodiment, the instruction may indicate a timeframe during which the node should use the second routing domain. In another embodiment, the instruction may indicate a particular class of traffic that the node should send via the second routing domain. In particular, the available capacity of the second routing domain to accommodate traffic from the candidate node may, in some embodiments, be determined on a per-class basis. Accordingly, the device may cause the node to send all traffic via the second routing domain or only a subset of its traffic. Procedure 700 then ends at a step 730.

Figure 8:
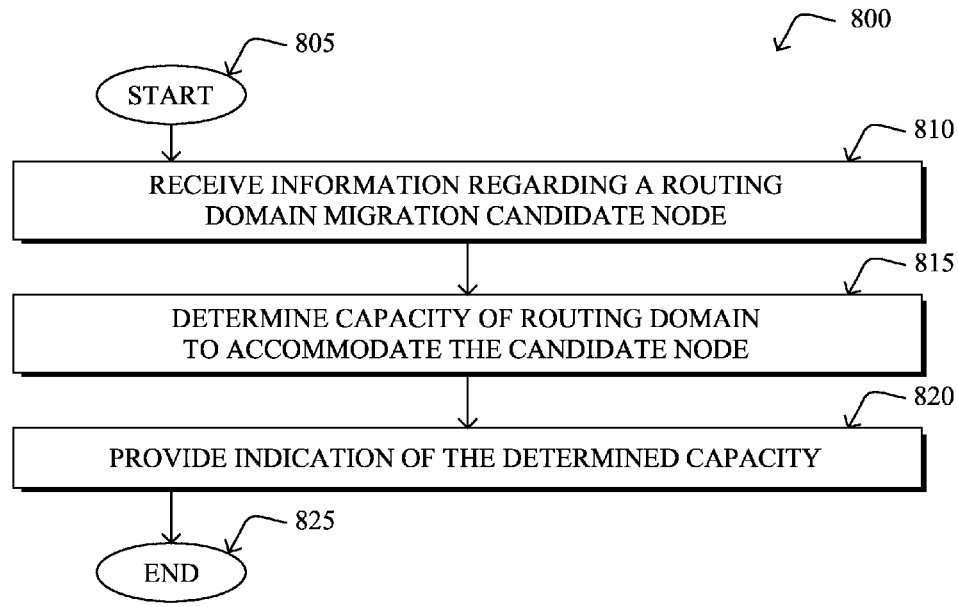
FIG. 8 illustrates an example simplified procedure for evaluating the ability of a routing domain to accommodate a migration candidate.

FIG. 8 illustrates an example simplified procedure for evaluating the ability of a routing domain to accommodate a migration candidate, in accordance with various embodiments herein. Procedure 800 may be performed by any supervisory device in a network (e.g., device 200) such as a FAR/BR/Root node of a routing domain, an NMS, etc.). Procedure 800 may begin at a step 805 and continue on to step 810 where, as described above, the device may receive information regarding a routing domain migration candidate node. The migration candidate node may be part of a first routing domain, but be within range of a second routing domain. In various embodiments, the information regarding the candidate node may identify the node, a neighbor of the node that belongs to the second routing domain, a traffic profile for the candidate node (e.g., an overall traffic profile, traffic profiles broken down by traffic class, etc.), a node type of the candidate node, or any other information that may be used to determine whether the second routing domain can accommodate traffic from the candidate node.

At step 815, the device determines a capacity of the second routing domain to accommodate traffic from the candidate node, according to various embodiments. In general, the device may determine whether the second routing domain has excess capacity that is sufficient to handle any additional network load caused by the candidate node using the second routing domain. In some embodiments, the device may identify the one or more routing paths in the second routing domain that would be used by the candidate node, were the candidate node to join the second routing domain. In some embodiments, the device may analyze the characteristics of the routing path(s), to determine the excess capacity. For example, the device may analyze any existing contention along the paths, etc., to quantify how much extra load can be placed on the path. In another embodiment, the device may combine a traffic profile associated with the candidate node with a traffic profile associated with the routing path(s). The device may use this combined traffic profile to determine whether the combined traffic load would impinge operation of the second routing domain. In further embodiments, the capacity may be determined separately for different traffic classes.

At step 820, the device provides an indication of the determined capacity, as detailed above. For example, in response to receiving information regarding a migration candidate node, the device may return an indication as to whether or not the second routing domain has sufficient capacity to accept traffic from the candidate node. The indication may be provided to a supervisory device responsible for making routing domain migration decisions. For example, the device may provide the indication to the FAR/BR/Root node of the first routing domain or to another device that may use the indication to determine whether the candidate node should use the second routing domain. Procedure 800 then ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for dynamic capacity-based routing domain load balancing. In particular, the techniques herein take advantage of the fact that nodes may join a set of overlapping routing domains (e.g., PANs), to more effectively load share traffic dynamically and using predictive methods, thus improving significantly load sharing between the routing domains and, consequently, also improve the quality of service.

While there have been shown and described illustrative embodiments that provide for dynamic capacity-based routing domain load balancing, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
exchanging, by a device in a network with another device in the network, information regarding nodes that overlap routing domains, wherein the information includes data indicative of a traffic profile of each of the nodes that overlap routing domains;
based on the exchanged information, identifying, by the device in the network, a routing domain migration candidate node in a first routing domain that is in range of a second routing domain, wherein the candidate node overlaps the first routing domain and the second routing domain;
determining, by the device, that the second routing domain is able to accommodate the candidate node sending traffic via the second routing domain based on whether the second routing domain has excess capacity that is sufficient to handle an additional network load caused by the candidate node using the second routing domain;
determining, by the device, that the candidate node should send traffic via the second routing domain, based in part on a determination that the second routing domain is able to accommodate the candidate node sending traffic via the second routing domain; and based on a determining that the second routing domain is able to accommodate the candidate node sending traffic via the second routing domain and that the candidate node should send traffic via the second routing domain, causing, by the device, the candidate node to move to the second routing domain to send traffic via the second routing domain.

2. The method as in claim 1, further comprising:

providing, by the device, information regarding the candidate node; and receiving, at the device, an indication that the second routing domain is able to accommodate the candidate node sending traffic via the second routing domain, wherein the determination that the second routing domain is able to accommodate the candidate node sending traffic via the second routing domain is based on the received indication.

3. The method as in claim 1, wherein determining that the candidate node should send traffic via the second routing domain is based in part on a determination that traffic in the first routing domain is not satisfying a service level agreement associated with the traffic or based on a prediction that traffic in the first routing domain will not satisfy the service level agreement.

4. The method as in claim 1, wherein the candidate node is protected against power failures, and wherein determining that the candidate node should send traffic via the second routing domain is based on a determination that causing the candidate node to send traffic via the second routing domain will increase resiliency of the second routing domain against power failures.

5. The method as in claim 1, wherein causing the candidate node to send traffic via the second routing domain comprises:

sending, by the device, an instruction to the candidate node that instructs the candidate node to send traffic via the second routing domain for a particular time period.

6. The method as in claim 1, wherein causing the candidate node to send traffic via the second routing domain comprises:

sending, by the device, an instruction to the candidate node that instructs the candidate node to send a particular class of traffic via the second routing domain.

7. The method as in claim 1, wherein determining that the candidate node should send traffic via the second routing domain is based in part on a predicted change to a routing topology of the first routing domain.

8. The method as in claim 1, wherein identifying the routing domain migration candidate node comprises:

receiving, at the device, an indication from the candidate node that the node is in range of the second routing domain.

9. A method comprising:

receiving, at a device in a network, information regarding a routing domain migration candidate node that is in a first routing domain of the network and is in range of a second routing domain, wherein the candidate node overlaps the first routing domain and the second routing domain, wherein the information includes data indicative of a traffic profile for the routing domain migration candidate node;

determining, by the device, a capacity of the second routing domain to accommodate traffic from the candidate node, wherein the device determines whether the second routing domain has excess capacity that is sufficient to handle an additional network load caused by the candidate node using the second routing domain; and providing, by the device, an indication of the capacity of the second routing domain to accommodate traffic from the candidate node to cause the candidate device to move to the second routing domain when the indication of the capacity of the second routing domain is sufficient to accommodate traffic from the candidate node.

10. The method as in claim 9, further comprising:

identifying, by the device, a routing path in the second routing domain that would be affected by the candidate node sending traffic via the second routing domain.

11. The method as in claim 10, wherein determining the capacity of the second routing domain to accommodate traffic from the candidate node comprises:

combining, by the device, the traffic profile of the node with a traffic profile associated with the identified routing path.

12. The method as in claim 10, wherein determining the capacity of the second routing domain to accommodate traffic from the candidate node comprises:

identifying, by the device, an amount of traffic congestion along the routing path.

13. An apparatus, comprising:

one or more network interfaces to communicate with a network;

a processor coupled to the one or more network interfaces and configured to execute a process; and a memory configured to store the process executable by the processor, the process when executed operable to:

exchange with another device in the network, information regarding nodes that overlap routing domains, wherein the information includes data indicative of a traffic profile of each of the nodes that overlap routing domains;

based on the exchanged information, identify a routing domain migration candidate node in a first routing domain that is in range of a second routing domain, wherein the candidate node overlaps the first routing domain and the second routing domain;

determine that the second routing domain is able to accommodate the candidate node sending traffic via the second routing domain based on whether the second routing domain has excess capacity that is sufficient to handle an additional network load caused by the candidate node using the second routing domain;

determine that the candidate node should send traffic via the second routing domain, based in part on a determination that the second routing domain is able to accommodate the candidate node sending traffic via the second routing domain; and based on a determining that the second routing domain is able to accommodate the candidate node sending traffic via the second routing domain and that the candidate node should send traffic via the second routing domain, cause the candidate node to move to the second routing domain to send traffic via the second routing domain.

14. The apparatus as in claim 13, wherein the process when executed is further operable to:

provide information regarding the candidate node; and receive an indication that the second routing domain is able to accommodate the candidate node sending traffic via the second routing domain, wherein the determination that the second routing domain is able to accommodate the candidate node sending traffic via the second routing domain is based on the received indication.

15. The apparatus as in claim 13, wherein the apparatus determines that the candidate node should send traffic via the second routing domain based in part on a determination that traffic in the first routing domain is not satisfying a service level agreement associated with the traffic or based on a prediction that traffic in the first routing domain will not satisfy the service level agreement.

16. The apparatus as in claim 13, wherein the candidate node is protected against power failures, and wherein the apparatus determines that the candidate node should send traffic via the second routing domain based on a determination that causing the candidate node to send traffic via the second routing domain will increase resiliency of the second routing domain against power failures.

17. The apparatus as in claim 13, wherein the apparatus causes the candidate node to send traffic via the second routing domain by:
sending an instruction to the candidate node that instructs the candidate node to send traffic via the second routing domain for a particular time period.

18. The apparatus as in claim 13, wherein the apparatus causes the candidate node to send traffic via the second routing domain by:
sending an instruction to the candidate node that instructs the candidate node to send a particular class of traffic via the second routing domain.

19. The apparatus as in claim 13, wherein the apparatus determines that the candidate node should send traffic via the second routing domain based in part on a predicted change to a routing topology of the first routing domain.

20. The apparatus as in claim 13, wherein the apparatus identifies the routing domain migration candidate node by:
receiving an indication from the candidate node that the node is in range of the second routing domain.

21. An apparatus comprising:
one or more network interfaces to communicate with a network;
a processor coupled to the one or more network interfaces and configured to execute a process; and
a memory configured to store the process executable by the processor, the process when executed operable to:
receive information regarding a routing domain migration candidate node that is in a first routing domain of the network and is in range of a second routing domain, wherein the candidate node overlaps the first routing domain and the second routing domain, wherein the information includes data indicative of a traffic profile for the routing domain migration candidate node;
determine a capacity of the second routing domain to accommodate traffic from the candidate node, wherein the device determines whether the second routing domain has excess capacity that is sufficient to handle an additional network load caused by the candidate node using the second routing domain; and
provide an indication of the capacity of the second routing domain to accommodate traffic from the candidate node to cause the candidate device to move to the second routing domain when the indication of the capacity of the second routing domain is sufficient to accommodate traffic from the candidate node.

22. The apparatus as in claim 21, wherein the process when executed is further operable to:
identify a routing path in the second routing domain that would be affected by the candidate node sending traffic via the second routing domain.

23. The apparatus as in claim 22, wherein the apparatus determines the capacity of the second routing domain to accommodate traffic from the candidate node by:
combining the traffic profile of the node with a traffic profile associated with the identified routing path.

24. The apparatus as in claim 22, wherein the apparatus determines the capacity of the second routing domain to accommodate traffic from the candidate node by:
identifying an amount of traffic congestion along the routing path.

* * * * *